(No Model.) 3 Sheets—Sheet 1.

W. H. THRESHER.
CAR AND AIR BRAKE COUPLING.

No. 439,260. Patented Oct. 28, 1890.

Witnesses:
Louis Clark.
E. Behel.

Inventor:
William H. Thresher
By. A. O. Behel
Atty.

THE NORRIS PETERS CO., PHOTO-LITHO., WASHINGTON, D. C.

(No Model.) 3 Sheets—Sheet 2.

W. H. THRESHER.
CAR AND AIR BRAKE COUPLING.

No. 439,260. Patented Oct. 28, 1890.

Witnesses:
Louis Clark
E. Behel.

Inventor:
William H. Thresher
By. A. O. Behel
Atty.

(No Model.) 3 Sheets—Sheet 3.

W. H. THRESHER.
CAR AND AIR BRAKE COUPLING.

No. 439,260. Patented Oct. 28, 1890.

Witnesses:
J. S. Clark
E. Behel

Inventor:
William H. Thresher
By A. O. Behel
Atty.

UNITED STATES PATENT OFFICE.

WILLIAM HOBART THRESHER, OF AMBOY, ILLINOIS.

CAR AND AIR-BRAKE COUPLING.

SPECIFICATION forming part of Letters Patent No. 439,260, dated October 28, 1890.

Application filed July 8, 1889. Serial No. 316,794. (No model.)

*To all whom it may concern:*

Be it known that I, WILLIAM HOBART THRESHER, a citizen of the United States, residing at Amboy, in the county of Lee and State of Illinois, have invented certain new and useful Improvements in Car and Air-Brake Couplings, of which the following is a specification.

The object of this invention is to construct a car and pipe coupling so that in coupling the cars the pipes may be coupled at the same time and by the same movements. I accomplish this by having the pipes pass through the link which forms the connection between the cars, and when the link is in position to be coupled the opening in the link will coincide with the opening in the other car, thereby forming a continuous passage from one car to another, and by a movement of a lever the valves placed in the pipes that run through the link will be opened, permitting the passage of air, water, or steam, as occasion may require.

Figure 1:
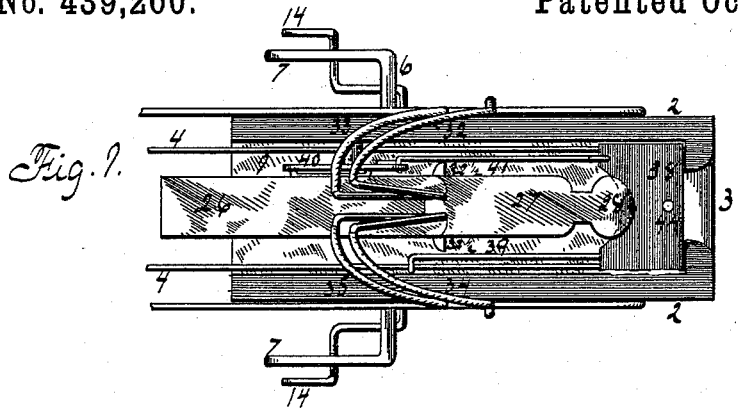
Figure 2:
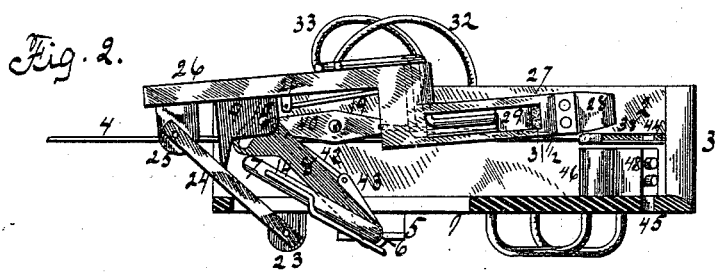
Figure 3:
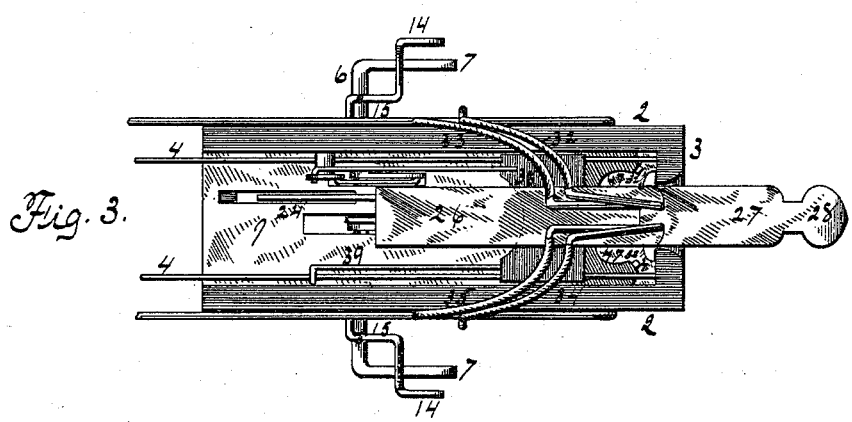
Figure 4:
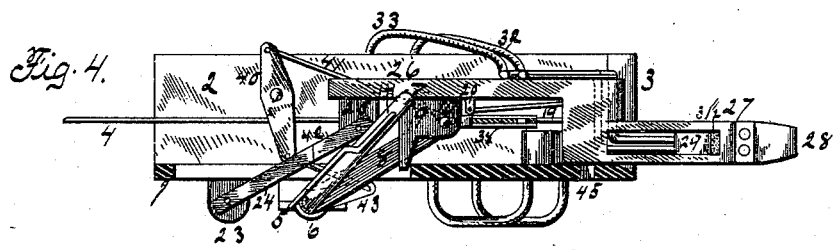
Figure 5:
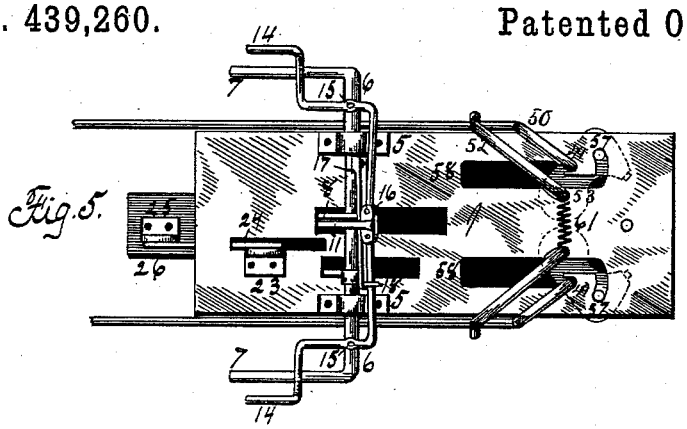
Figure 6:
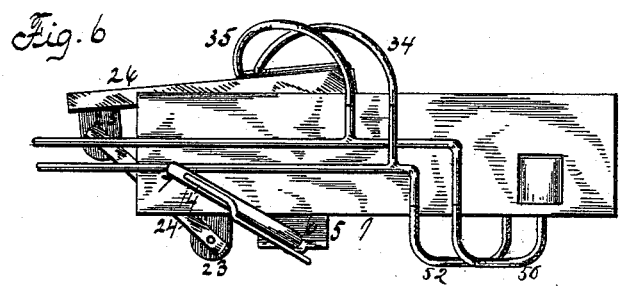
Figures 7, 8:
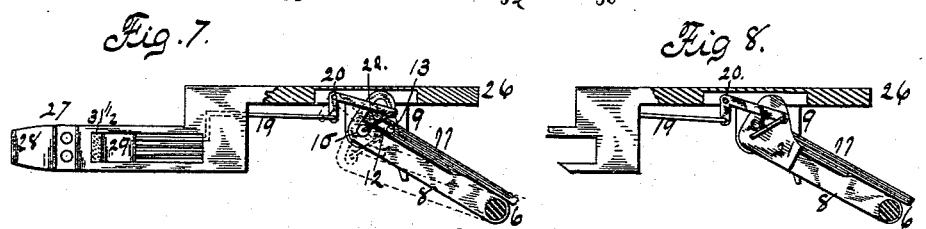
Figure 9:
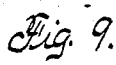
Figure 10:
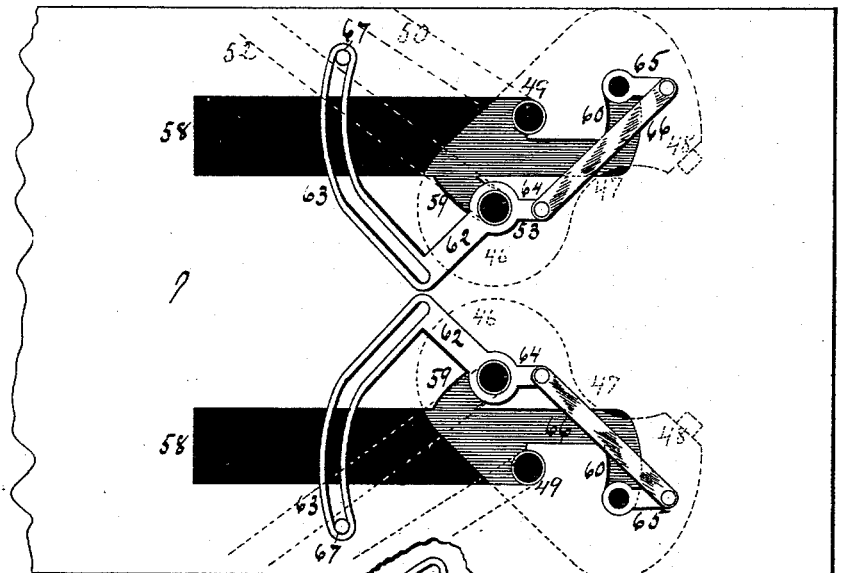
Figure 11:
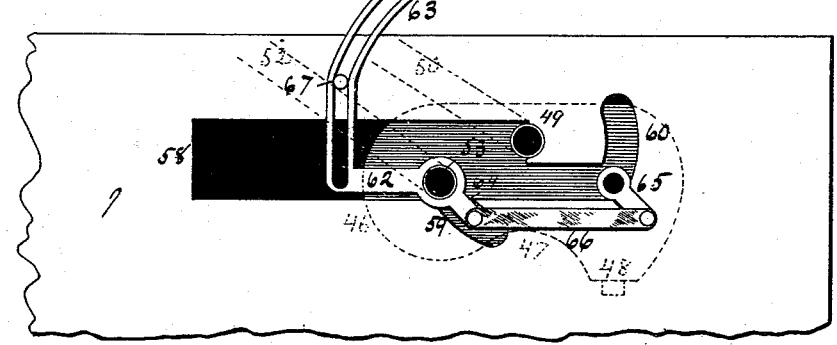
Figure 12:
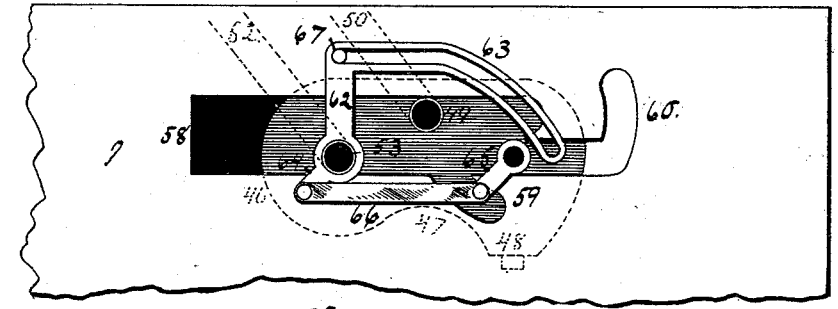
Figure 13:
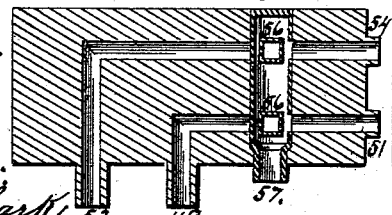
Figure 14:
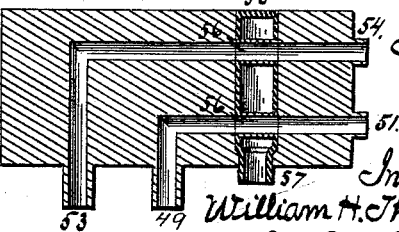

In the accompanying drawings, Figure 1 is a plan view of my invention, showing the connecting-link retracted. Fig. 2 is a lengthwise vertical central section through the draw-head with the parts in the same position as shown at Fig. 1. Fig. 3 is a plan view showing the connecting-link extended in position to be coupled. Fig. 4 is a lengthwise vertical central section through the draw-head with the parts in the same position as shown at Fig. 3. Fig. 5 is an under side view of the draw-head, showing the arrangement of the parts, and in which the mechanism for operating the valves in the sliding head is omitted, and which is shown upon an enlarged scale in subsequent figures. Fig. 6 is a side elevation of the draw-head with the connecting-link retracted. Figs. 7 and 8 are side elevations of the connecting-link, showing the mechanism for operating the flukes and valves in the connecting-link. Fig. 9 is a horizontal section through the draw-heads, sliding heads, and connecting-link, showing the arrangement of the parts. Figs. 10, 11, and 12 are enlarged under side views of the draw-heads, showing the mechanism for operating the valves in the sliding heads in their various positions. Figs. 13 and 14 are vertical sections through the sliding heads, showing the valves in their open and closed positions.

The draw-head herein represented consists of the bottom 1, sides 2, and end 3, cast integral. The end 3 is provided with an opening having an outward-flaring mouth, as common in this class of couplers. Rods 4 connect with the end 3 of the draw-head, and connect with the draw-head at the other end of the car, thus bringing the strain upon the rods instead of on the draw-heads or car-timbers.

The draw-head herein shown may be supported under the car in any suitable manner, and I have not deemed it necessary to show its connection with the car.

To the under side of the draw-head are secured bearings 5, in which oscillates a shaft 6, extending transverse of the draw-head and which has upturned handle portions 7. To this shaft, about midway of its length, is secured an arm 8, so as to move therewith. The free end of this arm has a pivotal connection with the connecting-link by means of a bracket 9, secured to its under side. This connection is more clearly shown at Figs. 7 and 8. The free end of the arm 8 is slotted and the pivot-bolt 10 plays in this slot. An arm 11 has its end provided with a lengthwise slot 12, and a stud 13, secured to the arm 8, limits the movement of the arm. The object of this arm is to hold the pivot-bolt 10 in either end of the slot, and the arm retracts, in order to allow the arm 8 to assume a position shown in dotted lines in Fig. 7. The lengthwise movement of the arm 11 is effected by means of operating-handles 14, having a pivotal connection with the transverse shaft 6 at 15. The free ends of the handles extend in such a manner as to be grasped at the same time with the handles 7, so that they may be operated in unison, if desired. These handles 14 have a connection with the arm 11 by being pivoted to a cross-piece 16, as shown. A flat spring 17 is secured to the transverse shaft 6, and by a link 18 its free end is connected with the handles 14. The action of this spring is to hold the arm 11 so as to confine the pivot-bolt 10 in either end of the slot, as shown in solid lines at Fig. 7. This arm may be retracted by pressing against the handles 14, and when released the spring will return the arm to its normal position. The object of this slot in the free end of the arm 8 is to impart a movement to the bar 19 in the direction of its length, for a purpose to appear hereinafter. This movement is accomplished by means of a bell-crank lever 20, having a pivotal connection with the connecting length. Plate 21 is connected to the arm 8 and acts as a shield to the parts, but is designed expressly for the purpose of forming a connection between the arm 8 and the bell-crank lever 20 through the medium of a link 22. When the parts are in position shown at Fig. 8, the pivot of the arm 8 with the bracket 9 and the connection of the link 22 with the plate 21 will be directly opposite, and any movement of the shaft 6 by means of handles 7 will not change the position of the bell-crank lever; but when it is desired to move the bar 19 forward, by pressing on the handles 14 the arm 11 will be retracted, thereby allowing the arm 8 to move forward the length of the slot in its end. This movement will change the relation of the pivots and the parts will assume the position shown in dotted lines in Fig. 7, and the releasing of the handle 14 will permit the arm to return to its normal position, thereby locking the pivot-bolt 10 in the opposite end of the slot and preventing the withdrawal of the flukes or closing of the valves.

A bracket 23 is secured to the under side of the draw-head, and by a brace 24 is connected with the bracket 25, secured to the rear under side of the connecting-link. By means of this brace and the arm 8 the required movement is given to the connecting-link. Thus in its rearward position it will assume that shown at Fig. 2 and in its forward position that shown at Fig. 4.

The connecting-link consists of a rear portion 26 and a forward portion 27. The forward portion is on a lower plane than the rearward portion for the purpose of passing a head, and lower than the sliding heads placed in the forward end of the draw-heads, as shown at Figs. 3 and 4. The extreme forward end is pointed and formed with a head 28. The link is provided with a horizontal groove, in which are located flukes 29, pivoted to the link by a bolt or rivet 30. To these flukes is pivoted a link 31, having a pivotal connection at its other end with the sliding bar 19. When the connection-link enters the draw-head of a car, the flukes are folded so as to be within the connection-link, as shown in dotted lines, Fig. 9, which is accomplished by the rearward movement of the bar 19, as above explained. After the connecting-link is in position a forward movement of the bar 19 through the links 31 will cause the flukes to be thrown out and engage the inner face of the end 3 of the draw-bar, as shown in solid lines, Fig. 9, when the cars will be coupled, and rubber cushions 31½ are so placed as to receive the shock and form a yielding connection of the parts.

The connecting-link is provided with projections 32½ near the rear of its forward portion, so as to engage the end 3 of the draw-head, of which it is a part, thus forming a connection between the draw-heads of two cars without straining the internal mechanism. In this connecting-link are located four pipes 32, 33, 34, and 35—one air-brake pipe, one pipe by means of which the engineer may be signaled, one pipe for hot water or steam to be used for heating the cars, whereby one or more cars may be heated for the transportation of perishable freight in cold weather, and a pipe for cold water for stock-trains, by which the stock can be watered and cooled *en route* with water from the tank of the engine. These pipes enter the link and pass horizontally along its forward portion and open out through the neck just back of the head 28. Valves 36 are placed in the pipes and are opened and closed by means of arms 37, having their free ends slotted, and a pin passed through the slot into the bar 19. The forward movement of the bar 19 opens the valves, allowing the passage of air, steam, &c., and its rearward movement will close the valves, as shown in dotted lines, Fig. 9.

Upon the rods 4 is supported a plate 38, so as to move in the lengthwise direction of the rods. A short rod 39 has one end connected to this plate, and its other end is in hook form and passes around one of the rods 4 and forms a guide for one end of the plate in its movements. The mechanism for moving this plate consists of a link 40, pivoted to the inside of the draw-head. A rod 41 connects the short arm of this link with the plate 38, and a rod 42 connects the longer end of the link with an arm 43, secured to the transverse shaft 6. While the connecting-link is out of action, as shown at Fig. 2, the plate 38 will be at its extreme forward position, so as to protect the mechanism thereunder; also to form means by which the ordinary link and pin may be employed, namely: A hole 44 through the plate 38 coincides with a hole 45 in the bottom of the draw-head. When a link is placed in the draw-head and a pin passed through these holes, we have the ordinary coupling. The plate is held in its forward position by the link 40 assuming a horizontal position, causing a lock in the levers, and which resists any tendency of the incoming link to force it backward, and by means of the lever 7 the lock may be broken and the plate moved rearward for the purposes above set forth. When it is desired to employ the coupling-link herein described, the plate 38 will retract, thus enabling the link to descend to a horizontal plane, as shown in Fig. 4. Under this plate 38 are placed sliding heads. (Shown enlarged at Figs. 9 to 14, inclusive.) These heads are for the purpose of forming a connection of the various pipes from one car to another and are automatic in their movements, and when the cars are uncoupled they assume the position shown at Fig. 10. These are of irregular outline form, having their rear ends 46 nearly circular, with a concavity 47 in their inner faces. When the head of the connecting-link enters the draw-head, it presses against the rear end of the sliding heads, causing them to turn inward, bringing the end 48 into the neck of the connecting-link on opposite sides, as shown in Fig. 9. The pivot upon which the sliding head oscillates consists of a tubular stud 49, projecting from the head through the bottom of the draw-head a sufficient distance to receive a tubular hose 50. This stud 49 has an outward communication through the portion 48 of the head by a tubular stud 51. Another hose 52 connects with this sliding head by passing over the tubular stud 53 in the rear end of the head. This stud also has an outward communication through the portion 48 of the head by a tubular stud 54. The two passages through the sliding head come directly one over the other at a point where a tubular valve, 55 is placed, so as to open and close the passage in both pipes at the same operation. The valve is more clearly shown at Figs. 13 and 14, which consists of a tubular shank having its lower end somewhat reduced, so as to form a seat. This tubular shank has two transverse openings 56 opposite the tubular openings in the sliding head, and when the valve is turned, as shown at Fig. 14, the passage will be open, but when turned a quarter of a revolution they will close the opening on the end toward the hose, but in so turning will open, so as to permit the escape of water, &c., from the end 51 and 54 by descending the tubular passage 57 and be discharged upon the ground.

In allowing the studs 49, 53, and 55 to pass through the bottom of the draw-head and permit the oscillation of the head openings are prepared, as shown at Fig. 10, consisting of the main lengthwise slot 58 and two curved slots 59 and 60. The heads are held in the position shown at Figs. 5 and 10 by a spring 61, connecting the studs 53 of the two heads.

The mechanism for operating the valves in the sliding heads consists of the peculiar-shaped lever 62, provided with an outward-projecting slotted wing 63 and a short arm 64. This lever acts upon the stud 53 as its pivot. The valve has a short arm 65 corresponding to the arm 64. Said arms are connected by a link 66, pivoted at each end. The operation of these levers will now be explained. While the heads remain as shown at Figs. 5 and 10 the valves will be closed, as shown at Fig. 13. When the connecting-link enters the draw-head, the heads will assume the position shown in Fig. 11, and the valves will still be closed. By the farther insertion of the connecting-link the sliding heads will be slid rearward, and in such movement the stud 67 in the slotted arm will cause the parts to assume the position shown in Fig. 12, and the valve will be open, as shown at Fig. 14. This extent of movement of the heads is necessary in order to allow the flukes of the connecting-link to be thrown out, as before described, and any further backward movement of the heads will not affect the valves. When the connecting-link is withdrawn, the heads will be in the position shown at Fig. 10, and the spring connecting the heads will cause them to oscillate on their pivotal support, when they will assume their normal position. The heads come in contact with the inner sides of the draw-head in their sliding movements, which will press the tubular projecting ends into the openings in the neck of the connecting-link, thereby making a close connection between the pipes in the sliding head and connecting-link. If deemed necessary, a packing may be placed at the openings in the sliding heads, insuring a perfect connection, as shown at Fig. 9.

I have produced a device for adjusting the pressure of the sliding heads upon the connecting-link, which consists of an adjustable wedge-like piece 68 and a screw 69 for moving said wedge in either direction.

As will be seen from an inspection of Fig. 6, but two pipes run along each side of the draw-head. Each of these pipes has two branches, one branch passing through the connecting-link and the other through the sliding head. When the connecting-link is employed, the valves in the link will be open and the valves in the sliding head of that end of the car will be closed.

By the arrangement of the parts as above described the cars and pipes are coupled by the same operation and by one lever without necessitating the brakeman going between the cars, as the operating-lever extends beyond the sides of the car, within easy reach of an attendant on the ground, and by means of which the brakes may be operated while coupling cars in switching.

The coupling herein described gives the engineer the advantages of the slack of the train, as the couplings have the necessary lengthwise movement, as shown at Fig. 9.

I claim as my invention—

1. In a car-coupler, the combination of two draw-heads and rods extending beneath the floor of the car and connecting the draw-heads, said rods passing through the inside of the draw-heads and through the outer ends, to which they are attached, substantially as set forth.

2. In a car-coupler, the combination of a draw-head, a connecting-link provided with flukes, and means for operating both the link and flukes, substantially as set forth.

3. In the coupler herein described, the combination of a draw-head, a connecting-link, a plate movable in the lengthwise direction of the draw-head and provided with a vertical hole, and means for operating the link and plate, substantially as set forth.

4. In a car-coupler, the combination of a draw-head, a connecting-link, a movable plate provided with a vertical hole, an operating-lever at the side of the car, a link-connection between the lever and plate, whereby the link assumes a horizontal position when the plate is in its forward position, thereby locking it against rearward movement, substantially as set forth.

5. In a car-coupler, the combination of a connecting-link, flukes having a connection with the link, and pipes passing through the link, substantially as set forth.

6. In a car-coupler, the combination of a connecting-link, flukes having a connection with the link, and elastic cushions against which the flukes press, substantially as set forth.

7. In a car-coupler, the combination of a connecting-link, a pipe passing through the link, a valve carried by said link to open and close said pipe, and means for operating said valve, substantially as set forth.

8. In a car-coupler, the combination of a draw-head, a connecting-link, pipes passing through the head and the link, and valves for said link-carried pipes, substantially as set forth.

9. In a car-coupler, the combination of a draw-head, sliding heads engaged therewith, a pipe connected with the head and provided with a valve, and means for operating the valve, substantially as set forth.

10. In a car-coupler, the combination of sliding heads, pipes carried by said heads, a connecting-link engaging the heads, and means for adjusting the pressure between the heads and links, substantially as set forth.

11. In a car-coupler, the combination of a draw-head, heads engaged therewith having a sliding and oscillating movement, pipes carried by said heads, and means for returning the heads to their normal positions, substantially as set forth.

12. In a car-coupler, the combination of a connecting-link, arms connecting the link with the draw-head, pipes carried by the link, valves in the pipe, and a lever for imparting a back and forth movement to the link and operating the valves, substantially as set forth.

13. In a car-coupler, the combination of a connecting-link, pipes carried by said link, valves in the pipe, flukes having a connection with the link, a lever for imparting a backward and forward movement to the link and operating the valves and flukes, and a thumb-lever for locking the valves and flukes in the desired position, substantially as set forth.

WILLIAM HOBART THRESHER.

Witnesses:
DWIGHT W. SLAUTER,
JOSIAH LITTLE.